United States Patent
Rosner

(10) Patent No.: US 7,146,190 B2
(45) Date of Patent: Dec. 5, 2006

(54) WIRELESS COMMUNICATIONS SYSTEM FULLY INTEGRATED WITH THE INFRASTRUCTURE OF AN ORGANIZATION

(75) Inventor: S. Jeffrey Rosner, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 890 days.

(21) Appl. No.: 09/912,012

(22) Filed: Jul. 24, 2001

(65) Prior Publication Data

US 2003/0022696 A1   Jan. 30, 2003

(51) Int. Cl.
*H04B 1/38* (2006.01)

(52) U.S. Cl. .................. 455/557; 455/563; 455/552.1; 455/556.1

(58) Field of Classification Search ................ 455/411, 455/563, 557, 3.05, 421, 410, 90, 11.6; 379/88.01, 379/88.04; 704/275, 251, 246; 370/209
See application file for complete search history.

(56) References Cited

U.S. PATENT DOCUMENTS

| | | | |
|---|---|---|---|
| 6,396,804 B1 * | 5/2002 | Odenwalder | 370/209 |
| 6,442,532 B1 * | 8/2002 | Kawan | 705/35 |
| 6,650,888 B1 * | 11/2003 | Cook | 455/410 |

2002/0142734 A1 * 10/2002 Wickstead .................. 455/90

OTHER PUBLICATIONS

"Star Trek Communicator", Prop utilized in "Star Trek" television series, first episode believed aired in 1966, show believed to have been first copyrighted in 1965 by Gene Roddenberry, no month used.

* cited by examiner

*Primary Examiner*—Temica Beamer

(57) ABSTRACT

A wireless communications system integrated with the computer infrastructure of an organization so as to provide access to and permit utilization of features and capabilities of the computer infrastructure. The system has a portable unit having a user interface; a computer infrastructure interface; a voice recognition unit associated with the computer infrastructure interface, the voice recognition unit permitting a user of the portable unit to communicate with the computer infrastructure by voice communication; and a wireless communications link for connecting the user interface and the computer infrastructure interface, the wireless communications link covering an area designated by the organization for permitting the user of the portable unit to access the computer infrastructure when the portable unit is within the designated area. The portable unit does not require any significant computing power or memory or a large bandwidth capability as these capabilities are already present in the computer infrastructure. The portable unit, accordingly, can be made very small so that it can be comfortably worn by the user.

20 Claims, 2 Drawing Sheets

WIRELESS COMMUNICATIONS SYSTEM FULLY INTEGRATED WITH THE INFRASTRUCTURE OF AN ORGANIZATION

BACKGROUND OF THE INVENTION

1. Technical Field of the Invention

The present invention relates generally to the field of wireless communications; and, more particularly, to a wireless communications system for providing access to the computer infrastructure of an organization.

2. Description of Related Art

In recent years, the growth in the availability and use of personal portable electronic devices has been phenomenal. Examples of the numerous portable electronic devices that are currently available for personal use include wireless telecommunications devices such as analog and digital cellular devices, direct-to-satellite devices, 900 MHz and 2.4 GHz portable home telephones, CB radios, pagers and 900 MHz point-to-point "walkie-talkies"; Internet access devices such as palmtops and laptops with wireless modems; and information storage devices such as Personal Digital Assistants (PDAs).

Many of these portable electronic devices provide features and capabilities that are not available in other devices; and, as a result, it has become a relatively common practice for an individual to carry around several electronic devices on his or her person. For example, an individual may, at the same time, carry around a device to communicate (e.g., a cell phone), a device for on demand notification (e.g., a pager) and a device to carry small amounts of information (e.g., a PDA or a Palm device).

Most personal portable communications devices currently on the market contain user interfaces of varying complexity, typically either a two-way audio transduction system or a screen and key/mouse/pen entry system; as well as communications hardware and software that are designed to maximize the range and bandwidth of the devices within the constraints of the particular applications for which the devices are designed. In this regard, although voice bandwidth requirements are relatively modest; even devices incorporating voice systems are today used for long-distance batch downloads, thus increasing the bandwidth requirements of the devices. Portable information storage devices often require central information servers and other components that increase their complexity, as well.

In view of the complexity of most personal portable electronic devices, the devices are somewhat costly; and also tend to be rather large and heavy, resulting in that the devices usually must be carried, rather than worn.

Furthermore, each personal portable electronic device comes with its own set of inconveniences. For example, most of the devices require periodic battery charging; and many also require periodic data backup. Also, because they must usually be carried; the devices are highly susceptible to being damaged, lost or mislaid.

Many of the numerous personal portable electronic devices currently in use duplicate capabilities of computer infrastructure that already exists in many organizations. For example, most universities and many companies already possess an extensive network/array of communications and database servers. For the most part, however, such existing infrastructure is only accessible to individuals when they are at their work stations or at other specific locations. The infrastructure is usually inaccessible to individuals as they move about the organization, even if they are carrying a cell phone, pager, PDA, or other portable electronic device.

It would, accordingly, be desirable to provide individuals with access to and the ability to utilize databases, communications capabilities and other features of the computer infrastructure of an organization even when the individual is away from his/her work station or other specific location where access to the infrastructure is normally available.

SUMMARY OF THE INVENTION

The present invention provides a wireless communications system that may be integrated with the computer infrastructure of an organization so as to provide access to and permit utilization of the infrastructure.

A wireless communications system for communicating with a computer infrastructure of an organization, according to the present invention, comprises a portable unit, including a user interface, and a computer infrastructure interface. A voice recognition unit is associated with the computer infrastructure interface to permit a user of the portable unit to communicate with the computer infrastructure by voice communication. The user interface and the computer infrastructure interface are connected by a wireless communications link that covers an area designated by the organization for permitting the user of the portable unit to access the infrastructure when the portable unit is within the designated area.

With the present invention, an individual may obtain access to and utilize databases, communications capabilities and other features of the computer infrastructure of an organization from any location within a designated area of the organization, utilizing only a single portable unit. For example, if the organization is a university, a student or professor of the university will be able to access and utilize the computer infrastructure of the university when the student or professor is in different buildings on the university campus, or simply walking around the university campus. If the organization is a company, an employee of the company will be able to access the computer infrastructure of the company even when the employee is away from his/her desk, for example, on different floors of a building or in an adjacent building.

Because the function of the portable unit is simply to access existing infrastructure of the organization so that the user thereof can utilize capabilities of the infrastructure; the portable unit requires only a user interface, a transmit/receive portion of the wireless communications link, and a small battery or other power supply. The portable unit does not require a significant amount of computing power or memory as these features are already available in the infrastructure. In addition, because an embodiment of the wireless communications system of the present invention is typically designed to operate only within a relatively small designated area, the range of the portable unit needs only be sufficient to reach and communicate with the infrastructure. Furthermore, because the bandwidth capability of the portable unit needs only to match the bandwidth requirements of the user for voice communication; a large bandwidth capability is not required.

In effect, an embodiment of the present invention provides a portable communications system in which a portable unit carried by a user is separate from the services that the user requires. As a result, the system can be designed to provide communications at the bandwidth required by the user, and not at the bandwidth needed to provide the desired services.

According to an embodiment of the present invention, a voice generation unit is also associated with the computer infrastructure interface; and the user interface comprises a two-way voice interface permitting two-way voice communication between the user and the computer infrastructure. This permits the wireless communications system to operate at a low bandwidth (e.g., less than 100 kbits/sec); and also permits miniaturization of the portable unit such that it can be easily worn, for example, as a small badge, bracelet, brooch or necklace. The portable unit can also be conveniently mounted on the head of the user and even be a completely ear-mounted unit, if desired. Furthermore, because the portable unit is required to transmit/receive within only a relatively small designated area; it can be of low power, requiring only a small battery or other power source for operation.

According to further embodiments of the invention, the wireless communications system can include various additional capabilities. For example, the system can include an authentication capability to enable the user to obtain rapid access to secured areas or equipment of the organization. Such authentication capability may, for example, comprise a magcard or a Radio Frequency Identification (RFID) device incorporated in the portable unit so as to make it unnecessary to separately carry around such a device; or it may comprise a suitable software-based voice recognition authentication capability incorporated in the infrastructure software.

In general, the wireless communications system of the present invention permits an individual to obtain access to the computer infrastructure of an organization, and to utilize the various features and capabilities of the infrastructure including, for example, access to the infrastructure longlines, directory lookup, calendaring, facility reservations, E-Mail send and receive, and the like. In addition, the system can provide the user with complete Internet access via the computer infrastructure insofar as the information can be provided with voice communication. All that is required is that the individual have the portable unit and be generally within the designated area of the organization.

The wireless communications system of the present invention can be "piggy-backed" onto the existing computer infrastructure of an organization with minimal additional cost, and can be used to permit communications between the computer infrastructure and a set of deployed portable units carried by a plurality of individuals as they move about the designated area(s).

Further advantages and specific features of the invention will become apparent hereinafter in conjunction with the following detailed description of embodiments of the invention.

BRIEF DESCRIPTION OF THE DRAWINGS

A more detailed understanding of the invention may be had from the following description of preferred embodiments, given by way of example and to be understood in conjunction with the accompanying drawing wherein.

DETAILED DESCRIPTION OF THE EXEMPLARY EMBODIMENTS OF THE INVENTION

The numerous innovative teachings of the present application will be described with particular reference to the presently preferred exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
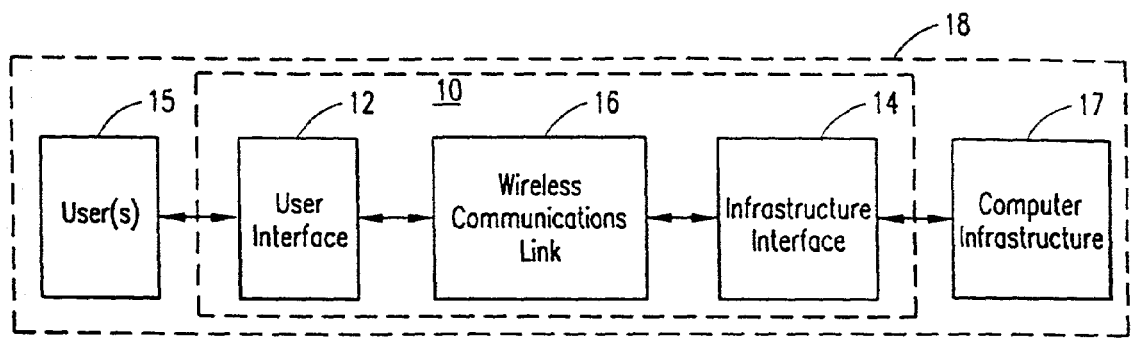
FIG. 1 is a block diagram schematically illustrating a wireless communications system to permit a user to access the computer infrastructure of an organization according to an embodiment of the present invention.

FIG. 1 schematically illustrates a wireless communications system for permitting a user to access a computer infrastructure of an organization according to an embodiment of the present invention. The system is generally designated by reference number 10 and comprises three basic parts including a user interface 12, a computer infrastructure interface 14 and a wireless communications link 16 for connecting the user interface 12 and the computer infrastructure interface 14.

The user interface 12 permits a user (or a plurality of users), designated by reference number 15, to input messages to be transmitted to the computer infrastructure of an organization, designated by reference number 17, and to receive messages from the computer infrastructure. Similarly, the computer infrastructure interface 14 permits the computer infrastructure to input messages to be transmitted to the user and to receive messages from the user.

The wireless communications link 16 preferably comprises a system for transmitting/receiving signals over a limited range; and preferably comprises a low-bandwidth cellular communications system. The cellular communications system may be any analog or digital-based wireless communications system. The wireless communications link may include wireless phone technology, for example, analog, digital, 900 MHz and other wireless phone technology. As will be explained more fully hereinafter, system 10 is particularly designed to be used within a designated area of the organization, schematically illustrated in FIG. 1 by dashed box 18.

The computer infrastructure 17 comprises all or part of the computer infrastructure of an organization. In an embodiment of the invention, for example, the infrastructure 17 comprises an extensive network/array of communications and database servers as are commonly found in many organizations such as, for example, a university or a company. It may also comprise the communications system of a communications enterprise. It is not intended, however, to limit the invention to any particular type of organization or to any particular form of computer infrastructure.

Figure 2:
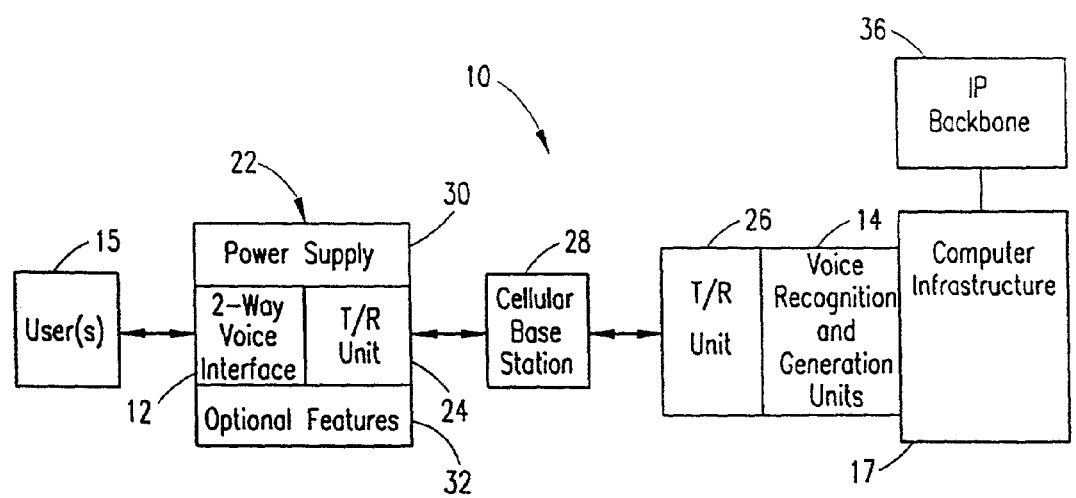
FIG. 2 is a block diagram schematically illustrating details of the wireless communications system of FIG. 1.

FIG. 2 schematically illustrates the wireless communications system 10 of FIG. 1 in greater detail. As shown, the user interface 12 is incorporated in a portable unit, generally designated by reference number 22, that is adapted to be worn or otherwise carried by a user 15. The user interface 12 may comprise a voice interface to permit the user to communicate with the computer infrastructure 17 by voice communications, and, as shown in FIG. 2, may comprise a two-way voice interface to permit two-way voice communication with the computer infrastructure. Correspondingly, the computer infrastructure interface 14 may comprise a voice recognition unit to permit the user to communicate with the computer infrastructure by voice communication, and may comprise both a voice recognition unit and a voice generation unit to permit two-way voice communication between the user and the computer infrastructure.

The wireless communications link 16 comprises a first transmit/receive unit 24, also incorporated within the portable unit 22, a second transmit/receive unit 26 associated with the computer infrastructure 17, and a cellular base station 28 for handling the transmission of signals between the transmit/receive units 24 and 26. The cellular base station may be associated with the computer infrastructure 17, or it may be a separate unit. As also shown in FIG. 2, the portable unit includes a power supply 30, such as a small battery or other power source; and may include one or more optional features, generally designated by reference number 32, that will be described hereinafter.

As indicated previously, an object of the wireless communications system of the present invention is to enable an individual to access the computer infrastructure of an organization and to utilize features and capabilities of the computer infrastructure when the individual is away from his/her work station or other location where direct access to the infrastructure is normally available; but is still located within a designated area of the organization where access to the computer infrastructure is normally not available, even if the individual is carrying a cell phone, a PDA, a pager or another portable electronic device. The designated area can be substantially any area designated by an organization; and preferably comprises a limited area that encompasses, for example, the facilities of an organization, the property on which an organization is located or a geographic area around the organization where individuals of the organization may be located. For example, if the organization is a university; the designated area might encompass all or part of the campus of the university; and, perhaps, student residential areas near the campus. If the organization is a company, the designated area might encompass a building or buildings in which the company is located, and a limited area around the building(s). As will be explained hereinafter, according to embodiments of the invention; the designated area might also comprise one or more extended designated areas that are created by the provision of one or more remote access nodes at selected locations.

According to an embodiment of the present invention, wireless communications system 10 is "piggy-backed" onto the existing computer infrastructure 17 of an organization so as to permit communication between the computer infrastructure and one or more deployed portable units worn or otherwise carried around by authorized individuals as they move about the designated area of the organization. Because communication is required only within the designated area, the wireless communications system 10 may require only a transmit/receive bandwidth/range sufficient for the one or more deployed portable units to reach and communicate with the infrastructure. Furthermore, in an embodiment of the present invention, a portable unit need not contain any computing power, high bandwidth capabilities, data storage or most of the other capabilities typically included in portable electronic devices; because these capabilities are already available in the computer infrastructure. As a result, the portable unit is capable of miniaturization; and, according to embodiments of the present invention, is sufficiently small so as to be capable of being comfortably worn by the user rather than carried.

In addition, because a portable unit may need to include only a user interface, a low power transmit/receive unit, and a small battery or other power source; it can be manufactured at a very low cost. For example, according to one embodiment of the invention, when the battery of the portable unit runs low, the entire unit may simply be discarded and replaced by a new unit. Alternatively, rather than discard "spent" units, exchange stations can be provided at different locations around the organization at which a portable unit could be exchanged for a "fresh" unit. This can be accomplished, for example, by erasing the previous user's ID and personalizing the unit for a new user by burning an EPROM or similar nonvolatile memory in the unit to prepare it for use by the new user, or by another personalizing procedure. In this regard, all the portable units utilized by an organization can be made identical except for the personalization in the firmware of the device.

According to a further embodiment of the invention, in addition to providing access to the features and capabilities of the infrastructure of an organization, the wireless communications system preferably also includes an Internet access capability via the computer infrastructure as illustrated by the IP (Internet Protocol) backbone 36 in FIG. 2.

Figure 3:
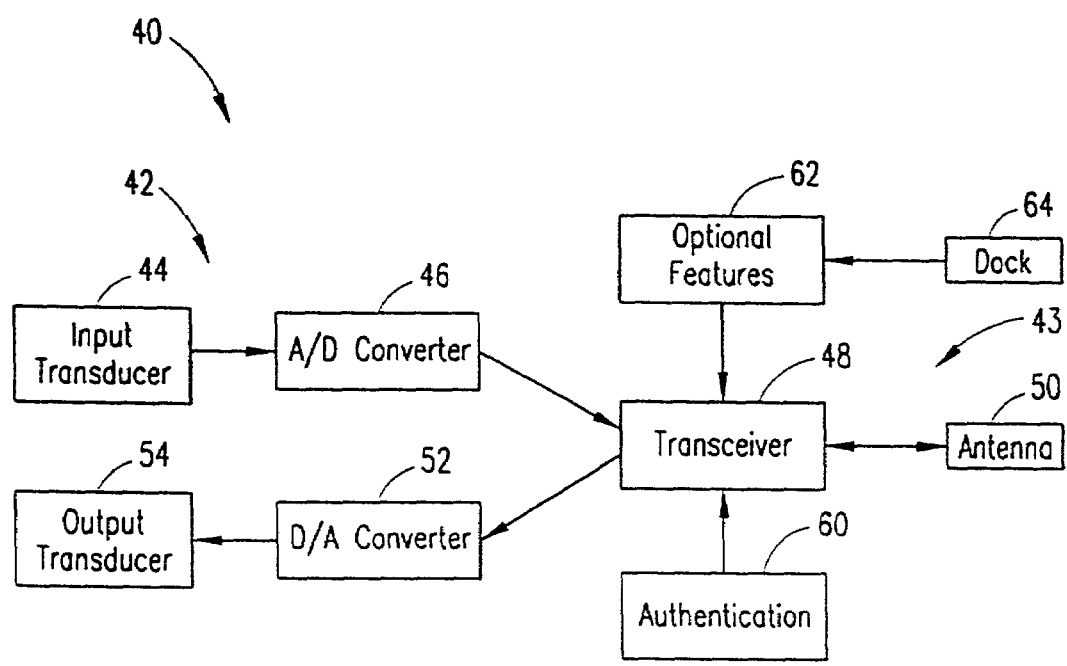
FIG. 3 is a block diagram schematically illustrating details of a portable unit of the wireless communications system of FIGS. 1 and 2 according to a further embodiment of the present invention.

FIG. 3 schematically illustrates a portable unit of the wireless communications system 10 according to an embodiment of the present invention. The portable unit is generally designated by reference number 40 and includes a user interface comprising a two-way voice interface 42; and a transmit/receive unit 43. The two-way voice interface 42 includes an input audio transducer 44 for converting the user's speech to an analog electrical signal, and an A/D converter 46 for converting the analog electrical signal to a digital signal. The digital signal is sent to a transceiver 48 of the transmit/receive unit 43 that transmits the digital signal via an antenna 50.

A signal received by the portable unit 40 is received by the transceiver 48 via the antenna 50 of the transmit/receive unit 43. The received digital signal is converted to an audio signal by D/A converter 52 and the output audio transducer 54 of the two-way voice interface 42.

Because the wireless communications system of the present invention is required to operate within only a designated area 18 and to communicate only with the computer infrastructure 17, the transceiver 48 may operate at less than 100 kbits/sec full duplex, e.g., at 80 kbits/sec., and the A/D and DIA converters 46 and 52 require only about 1000 Hz bandwidth. With simple compression and improvements to voice recognition algorithms, it is anticipated that some functionality can be obtained even when operating at as low as 10 kbits/sec.

As mentioned previously, the portable unit of the wireless communications system of the present invention can include various optional features as may be desired by the individual using the unit or the organization. One optional feature of the system may comprise an authentication capability. For example, an authentication device may be incorporated in the portable unit as illustrated at 60 in FIG. 3. Such a device may comprise a magcard, an RFID (Radio Frequency Identification) unit or another device that can be used to authenticate the user for access to secured rooms, buildings, equipment or other facilities in the designated area. Alternatively, the authentication capability may comprise software-based voice recognition incorporated in the computer infrastructure that authenticates a user via his or her voice. In addition, triangulation or a "cell contact" history could be used to localize a user and certify that the user is in the vicinity of the area for which access is being requested. In general, by providing an authentication capability in the wireless communications system of the present invention, a user will not have to carry around a separate authentication device, thus providing increased convenience to the user.

To improve the accuracy of voice authentication, the portable unit may optionally or intermittently operate at an increased bandwidth. This capability can, for example, be provided by a higher power, higher bandwidth burst mode; or, alternatively, sampling of the user's voice can be carried out at the higher rate and transmission of the sample can be carried out more slowly (although this procedure will require several seconds worth of memory in the portable unit).

The authentication capability can also be used to automatically authenticate an individual at any computer in the designated area as soon as the individual sits down. For example, an authentication can automatically enable the individual to use the computer and can also be designed to automatically recall the desktop of the individual as it was last left at a different computer.

The portable unit can also include additional optional features generally designated as 62 in FIG. 3 or as 32 in FIG. 2. Such additional optional features can include a power management user interface to enable the portable unit to be connected via a docking station 64 to an external power supply as might be provided at various locations in the designated area. The portable unit may also include the capability of being connected to suitable access nodes at selected locations to permit the unit to be connected into other wireless or wired communications systems. In particular, according to embodiments of the invention, the designated area of the organization can comprise one or more extended designated areas created by the provision of remote access nodes at selected locations to provide simple, voice-actuated functionality at locations that are more remote from the organization infrastructure. Examples may include a wireless link to a salesman's automobile or briefcase that provides a remote "virtual office" with voice-actuated capability; a link to a user's home, and the like.

For some information workers, the wireless communications system of the present invention may completely displace a user's work station, particularly when augmented, for example, by a separate display unit or an electronic paper-based device that can be updated with tabular or textual information for later reference by the user. Such an update can occur in the background rather than in series with the user transaction. If a display is needed, one display of appropriate size and functionality can be chosen and updated as a background function.

As mentioned above, the wireless communications system of the present invention permits miniaturization of the portable unit such that it can be comfortably worn by a user rather than carried. Thus, the unit can be in the form of a small badge worn on the user's shirt or jacket. The portable unit may also be in the form of a bracelet, ring, necklace or brooch. Particularly when the user interface comprises a two-way voice interface, the unit can be designed to be worn on the head as a headset, or to be fully ear-mounted as an earpiece. A fully ear-mounted unit can have both a transmit and receive capability, using, for example, side address or bone conduction microphones. Alternatively, the unit can just include an earpiece on a thin cable for use particularly when privacy or silent operation is desired.

In general, the wireless communications system of the present invention enables an individual to access and utilize the features and capabilities of the computer infrastructure of an organization as the individual moves around a designated area of the organization. Such features and capabilities include voice communication that accesses the infrastructure longlines, Internet access, directory look-up, calendaring, facility reservation, E-mail send and receive and numerous other features and capabilities. An embodiment of the invention would allow access to these features via voice recognition. Thus, various features of a mobile phone, PDA, Internet interface and the like are contained for each user in the computer infrastructure and are accessed and utilized via the portable unit.

While what has been described herein constitute exemplary embodiments of the invention, it should be recognized that the invention can be varied in many respects without departing from the scope thereof. For example, although the system has been primarily described in connection with providing access to the computer infrastructure of organizations such as a university or a company, these are intended to be exemplary only. The term "organization" as used herein is intended to include any entity that may have a computer infrastructure including, for example, shopping centers, office parks, professional offices, telecommunications systems, the downtown area of a city or other urban areas, automobiles, and the like.

Because the invention can be varied in numerous ways, it should be understood that the invention should be limited only insofar as is required by the scope of the following claims.

I claim:

1. A wireless communications system for communicating with a computer infrastructure of an organization comprising:

a portable unit including a user interface;

a computer infrastructure interface;

a voice recognition unit associated with said computer infrastructure interface, said voice recognition unit permitting a user of the portable unit to communicate with the computer infrastructure by voice communication;

a wireless communications link for connecting said user interface and said computer infrastructure interface, said wireless communications link covering an area designated by the organization for permitting a user of the portable unit to access said computer infrastructure when the portable unit is within the designated area; and at least one remote access node for creating at least one extended designated area of said designated area for permitting a user of the portable unit to also access the computer infrastructure when the portable unit is within the at least one extended designated area.

2. The wireless communications system according to claim 1, wherein said user interface comprises a two-way voice interface and wherein a voice recognition unit and a voice generation unit are associated with said computer infrastructure interface to permit two-way voice communication between said user and said computer infrastructure.

3. The wireless communications system according to claim 1, wherein said wireless communications link comprises a cellular communications system.

4. The wireless communications system according to claim 3, wherein said cellular communications system comprises a first transmit/receive unit in said portable unit, a second transmit/receive unit associated with said computer infrastructure and a cellular base station for handling transmission of signals between said first and second transmit/receive units.

5. The wireless communications system according to claim 3, wherein said cellular communications system operates at a bandwidth of less than 100 kbits/sec.

6. The wireless communications system according to claim 1, wherein said organization comprises a university, and wherein said designated area comprises a campus of the university.

7. The wireless communications system according to claim 1, wherein said organization comprises a company, and wherein said designated area comprises facilities of said company.

8. The wireless communications system according to claim 1, wherein said system further includes an authentication capability for authenticating a user of said portable unit for access to secured facilities of said organization.

9. The wireless communications system according to claim 8, wherein said authentication capability includes an authentication device in said portable unit.

10. The wireless communications system according to claim 8, wherein said authentication capability comprises a software-based voice recognition capability associated with said computer infrastructure.

11. The wireless communications system according to claim 1 wherein said portable unit is configured to be worn by the user.

12. The wireless communications system according to claim 1, wherein said system includes a plurality of portable units to permit a plurality of users to access the computer infrastructure of the organization.

13. The wireless communications system according to claim 1, wherein said system includes an Internet access capability.

14. In combination, a computer infrastructure of an organization and a wireless communications system for enabling at least one individual to communicate with and to utilize features and capabilities of said computer infrastructure, said wireless communications system comprising:
   a portable unit for each said at least one individual, each portable unit including a two-way voice interface;
   a computer infrastructure interface;
   a voice recognition unit and a voice generation unit associated with said computer infrastructure interface;
   a wireless communications link for connecting the user interface for each portable unit and the computer infrastructure interface, the wireless communications link covering an area designated by the organization for permitting each at least one individual to access the computer infrastructure by voice communication when the individual's respective portable unit is within the designated area; and
   at least one remote access node for creating at least one extended designated area of said designated area for permitting at least one of said at least one individual to also access the computer infrastructure when the portable unit of said at least one of said at least one individual is within the at least one extended designated area.

15. The combination according to claim 14, wherein said wireless communications link comprises a cellular communications system.

16. The combination according to claim 15, wherein said cellular communications system includes a first transmit/receive unit in each said portable unit, a second transmit/receive unit associated with said computer infrastructure, and a cellular base station for handling the transmission of signals between each said first transmit/receive units and said second transmit/receive unit.

17. The combination according to claim 14, wherein said each said portable unit is configured to be worn by the user.

18. The combination according to claim 14, wherein said wireless communications system further includes an authentication capability for authenticating access to secured facilities in said designated area.

19. The combination according to claim 14, wherein said features and capabilities include at least one of voice communication, directory look-up, calendaring, facility reservation and E-mail send and receive.

20. A wireless communications system for communicating with a computer infrastructure of an organization comprising:
   a portable communications unit including a user interface;
   a computer infrastructure interface;
   a wireless communications link for connecting said user interface and said computer infrastructure interface, said wireless communications link covering an area designated by the organization for permitting a user of the portable communications unit to access said computer infrastructure when the portable communications unit is within the designated area; and
   at least one remote access node for creating at least one extended designated area of said designated area for permitting a user of the portable communications unit to also access the computer infrastructure when the portable communications unit is within the at least one extended designated area.

* * * * *

UNITED STATES PATENT AND TRADEMARK OFFICE
CERTIFICATE OF CORRECTION

PATENT NO. : 7,146,190 B2  
APPLICATION NO. : 09/912012  
DATED : December 5, 2006  
INVENTOR(S) : Rosner It is certified that error appears in the above-identified patent and that said Letters Patent is hereby corrected as shown below:

On the Title page, in field (56), under "U.S. Patent Documents", in column 1, line 1, after "6,396,804" delete "B1" and insert -- B2 --, therefor.

Signed and Sealed this

Third Day of April, 2007

JON W. DUDAS  
*Director of the United States Patent and Trademark Office*